United States Patent
Braley et al.

(10) Patent No.: US 10,960,894 B2
(45) Date of Patent: Mar. 30, 2021

(54) AUTOMATED PERFORMANCE CHECKS FOR AUTONOMOUS VEHICLES

(71) Applicant: Waymo LLC, Mountain View, CA (US)

(72) Inventors: Colin Braley, Mountain View, CA (US); Volker Grabe, Redwood City, CA (US)

(73) Assignee: Waymo LLC, Mountain View, CA (US)

(*) Notice: Subject to any disclaimer, the term of this patent is extended or adjusted under 35 U.S.C. 154(b) by 209 days.

(21) Appl. No.: 16/219,386

(22) Filed: Dec. 13, 2018

(65) Prior Publication Data

US 2020/0189608 A1    Jun. 18, 2020

(51) Int. Cl.
| | | |
|---|---|---|
| B60W 50/029 | (2012.01) | |
| G05D 1/00 | (2006.01) | |
| B60W 50/02 | (2012.01) | |

(52) U.S. Cl.
CPC ...... *B60W 50/029* (2013.01); *B60W 50/0205* (2013.01); *G05D 1/0061* (2013.01); *G05D 1/0077* (2013.01); *B60W 2050/0215* (2013.01); *B60W 2050/0297* (2013.01)

(58) Field of Classification Search
CPC .......... B60W 50/029; B60W 50/0205; B60W 2050/0215; B60W 2050/0297; G05D 1/0061; G05D 1/0077
See application file for complete search history.

(56) References Cited

U.S. PATENT DOCUMENTS

| | | | |
|---|---|---|---|
| 4,119,900 A | 10/1978 | Kremnitz | |
| 9,719,801 B1 | 8/2017 | Ferguson et al. | |
| 9,916,703 B2 | 3/2018 | Levinson et al. | |
| 10,755,007 B2 * | 8/2020 | Shum | G06F 30/20 |

(Continued)

FOREIGN PATENT DOCUMENTS

JP          2002286455 A      10/2002

OTHER PUBLICATIONS

Katrakazaz et. al., "Real-time motion planning methods for autonomous on-road driving: State-of-the-art and future research directions", Transportation Research Part C: Emerging technologies vol. 60, Nov. 2015, pp. 416-442, https://www.sciencedirect.com/science/article/pii/S0968090X15003447 (Year: 2015).*

(Continued)

*Primary Examiner* — Calvin Cheung
(74) *Attorney, Agent, or Firm* — Botos Churchill IP Law

(57) ABSTRACT

Aspects of the disclosure provides for a method for performing checks for a vehicle. In this regard, a plurality of performance checks may be identified including a first check for a detection system of a plurality of detection systems of the vehicle and a second check for map data. A test route for the vehicle may be determined based on a location of the vehicle and the plurality of performance checks. The vehicle may be controlled along the test route in an autonomous driving mode, while sensor data may be received from the plurality of detection systems of the vehicle. An operation mode may be selected based on results of the plurality of performance checks, and the vehicle may be operated in the selected operation mode.

20 Claims, 10 Drawing Sheets

(56) References Cited

U.S. PATENT DOCUMENTS

| | | | |
|---|---|---|---|
| 2013/0204484 A1* | 8/2013 | Ricci | B60W 50/00 |
| | | | 701/29.4 |
| 2015/0266490 A1 | 9/2015 | Coelingh et al. | |
| 2016/0061627 A1 | 3/2016 | Tan et al. | |
| 2018/0089911 A1* | 3/2018 | Rath | G07C 5/0808 |
| 2018/0188037 A1 | 7/2018 | Wheeler et al. | |
| 2018/0196427 A1* | 7/2018 | Majumdar | G05D 1/0088 |
| 2018/0286142 A1* | 10/2018 | Pakki | B64D 45/00 |
| 2019/0225233 A1* | 7/2019 | Tod | G06Q 50/30 |

OTHER PUBLICATIONS

International Search Report and Written Opinion for Application No. PCT/US2019/064152 dated Mar. 20, 2020.

* cited by examiner

| Map Data 200 | Stored LIDAR values | Collected values from LIDAR sensor(s) 180 |
|---|---|---|
| Traffic light 216<br>Location = [x1, y1] | Vehicle location = [x_a, y_a]<br>Detected location = [x1, y1]<br>Detected orientation = 30° | Vehicle location = [x_a, y_a]<br>Detected location = [x1, y1]<br>Detected orientation = 25° |
| Pedestrian crossing 218<br>Location = [x2, y2] | N/A | N/A |
| Building 270<br>Location = [x3, y3] | Vehicle location = [x_a, y_a]<br>Detected location = [x3, y3]<br>Detected orientation = 15° | Vehicle location = [x_a, y_a]<br>Detected location = [x3, y3]<br>Detected orientation = 10° |
| Stop sign 260<br>Location = [x4, y4] | Vehicle location = [x_b, y_b]<br>Detected location = [x4, y4]<br>Detected orientation = 30° | Vehicle location = [x_b, y_b]<br>Detected location = [x4, y4]<br>Detected orientation = 25° |
| Parking lot 280<br>Location = [x5, y5] | Vehicle location = [x_b, y_b]<br>Detected location = [x5, y5]<br>Detected orientation = 30° | Vehicle location = [x_b, y_b]<br>Detected location = [x5, y5]<br>Detected orientation = 25° |

| | Tire Pressure | Wheel Alignment | Brake | Lights |
|---|---|---|---|---|
| Requirements | 35 psi | Camber = ±2<br>Caster = ±2<br>Toe = ±1 | Stopping distance = 20m | Left = responsive<br>Right = responsive<br>Reverse = responsive<br>Brake = responsive<br>Headlight = responsive |
| Measured | Front left = 40psi<br>Front right = 20 psi<br>Rear left = 40psi<br>Rear right = 40psi | Front left camber = 0.1<br>Front left caster = 0.5<br>Front left toe = -0.2<br>Front right camber = 0.1<br>Front right caster = -0.1<br>Front right toe = 0.1<br>Rear left camber = 0.2<br>Rear left caster = 0.1<br>Rear left toe = 0.5<br>Rear left camber = -0.1<br>Rear left caster = 0.1<br>Rear left toe = 0.1 | Stopping distance = 19m | Left = responsive<br>Right = responsive<br>Reverse = responsive<br>Brake = responsive<br>Headlight = unresponsive |

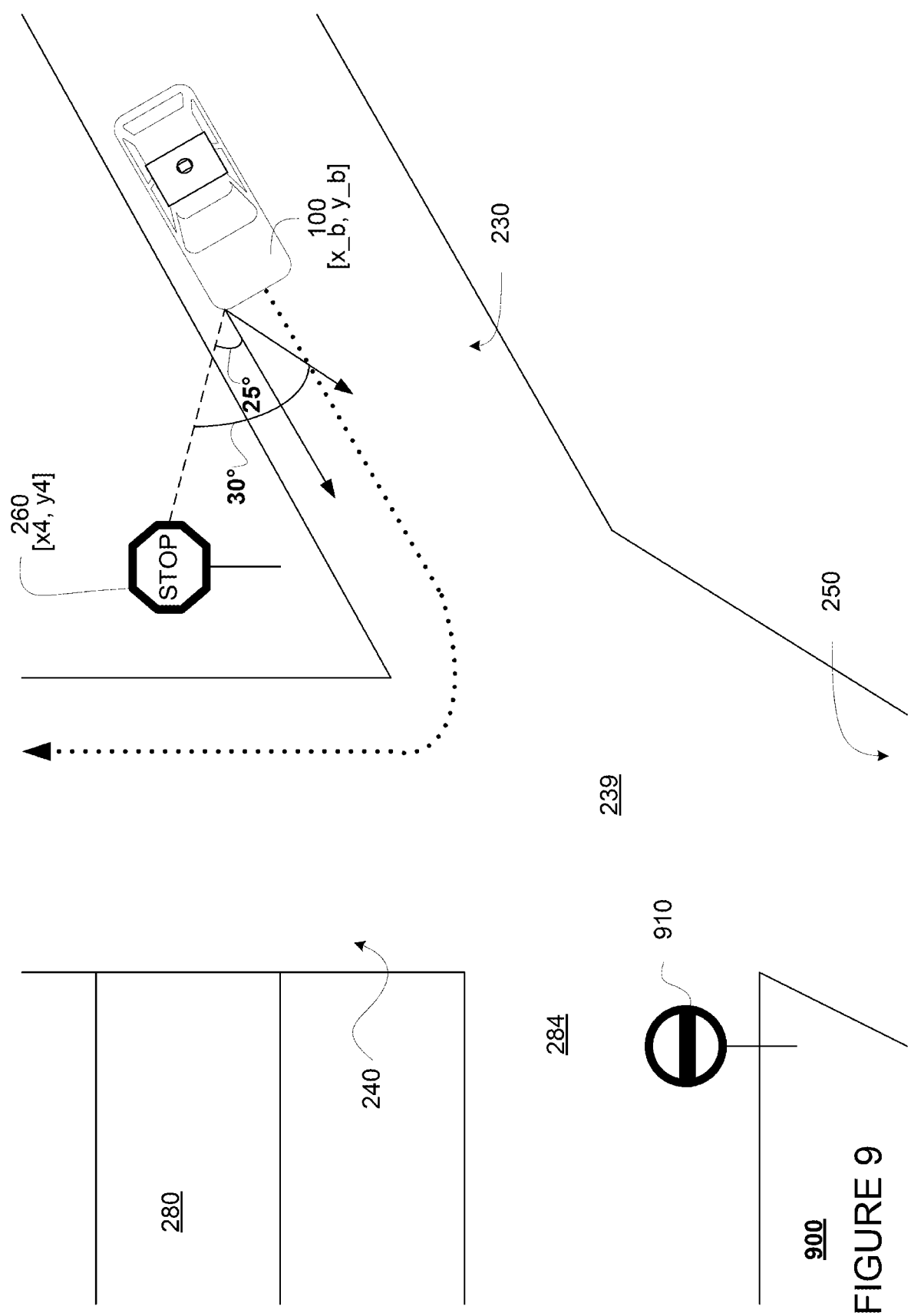

AUTOMATED PERFORMANCE CHECKS FOR AUTONOMOUS VEHICLES

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous tasks while the autonomous vehicle is in motion, which ultimately leads to decisions, such as speeding up, slowing down, stopping, turning, etc. The perception system may include a plurality of detection systems, such as cameras, sensors, and global positioning devices, which gathers and interprets images and sensor data about its surrounding environment, e.g., parked cars, trees, buildings, etc.

SUMMARY

Aspects of the disclosure provides for a system comprising one or more computing devices configured to identify a plurality of performance checks including a first check for a detection system of a plurality of detection systems of the vehicle and a second check for map data; select a plurality of road segments based on a location of the vehicle and the plurality of performance checks, wherein each of the plurality of road segments is selected for performing one or more of the plurality of performance checks; determine a test route for the vehicle by connecting the plurality of road segments and by connecting the location of the vehicle to one of the plurality of road segments; control the vehicle along the test route in an autonomous driving mode; while controlling the vehicle, receive sensor data from the plurality of detection systems of the vehicle; perform the plurality of performance checks based on the received sensor data; select an operation mode from a plurality of operation modes for the vehicle based on results of the plurality of performance checks; and operate the vehicle in the selected operation mode.

The plurality of road segments may include a first road segment, wherein one or more of the plurality of performance checks may be performed using one or more traffic features or stationary objects that are detectable along the first road segment. The plurality of road segments may include a second road segment on which a maneuver required for one or more of the plurality of performance checks can be performed.

The first check may include comparing characteristics of a detected traffic feature with previously detected characteristics of the traffic feature. The second check may include comparing a location of a detected traffic feature with a location of the detected traffic feature in the map data.

The plurality of performance checks may further include a third check for a component of the vehicle, the third check may include comparing one or more measurements related to the component of the vehicle with a threshold measurement.

The operation mode may be selected based on the results satisfying a threshold number of the plurality of performance checks. The operation mode may be selected based on the results satisfying one or more set of performance checks of the plurality of performance checks.

The one or more computing devices may be further configured to determine one or more corrections to at least one of the detection systems based on the results of the plurality of performance checks. Operating in the selected operation mode may include using the one or more corrections.

The one or more computing devices may be further configured to update the map data based on the results of the plurality of performance checks. Operating in the selected operation mode may include using the updated map data.

The selected operation mode may be an inactive mode.

The system may further comprise the vehicle.

The disclosure further provides for identifying, by one or more computing devices, a plurality of performance checks including a first check for a detection system of a plurality of detection systems of the vehicle and a second check for map data; selecting, by the one or more computing devices, a plurality of road segments based on a location of the vehicle and the plurality of performance checks, wherein each of the plurality of road segments is selected for performing one or more of the plurality of performance checks; determining, by the one or more computing devices, a test route for the vehicle by connecting the plurality of road segments and by connecting the location of the vehicle to one of the plurality of road segments; controlling, by the one or more computing devices, the vehicle along the test route in an autonomous driving mode; while controlling the vehicle, receiving, by the one or more computing devices, sensor data from the plurality of detection systems of the vehicle; performing, by the one or more computing devices, the plurality of performance checks based on the received sensor data; selecting, by the one or more computing devices, an operation mode from a plurality of operation modes for the vehicle based on results of the plurality of performance checks; and operating, by the one or more computing devices, the vehicle in the selected operation mode.

The plurality of road segments may include a first road segment, wherein one or more of the plurality of performance checks may be performed using one or more traffic features or stationary objects that are detectable along the first road segment. The plurality of road segments may include a second road segment on which a maneuver required for one or more of the plurality of performance checks can be performed.

The method may further comprise determining, by the one or more computing devices, one or more corrections to at least one of the detection systems based on the results of the plurality of performance checks, wherein operating in the selected operation mode may include using the one or more corrections. The method may further comprise updating, by the one or more computing devices, the map data based on the results of the plurality of performance checks, wherein operating in the selected operation mode may include using the updated map data.

The plurality of performance checks may be performed at a regular interval.

BRIEF DESCRIPTION OF THE DRAWINGS

FIG. 7 shows examples of collected sensor data in accordance with aspects of the disclosure.

FIG. 8 show examples of collected component data in accordance with aspects of the disclosure.

FIG. 9 show another example situation in accordance with aspects of the disclosure.

DETAILED DESCRIPTION

Overview

Figure 1:
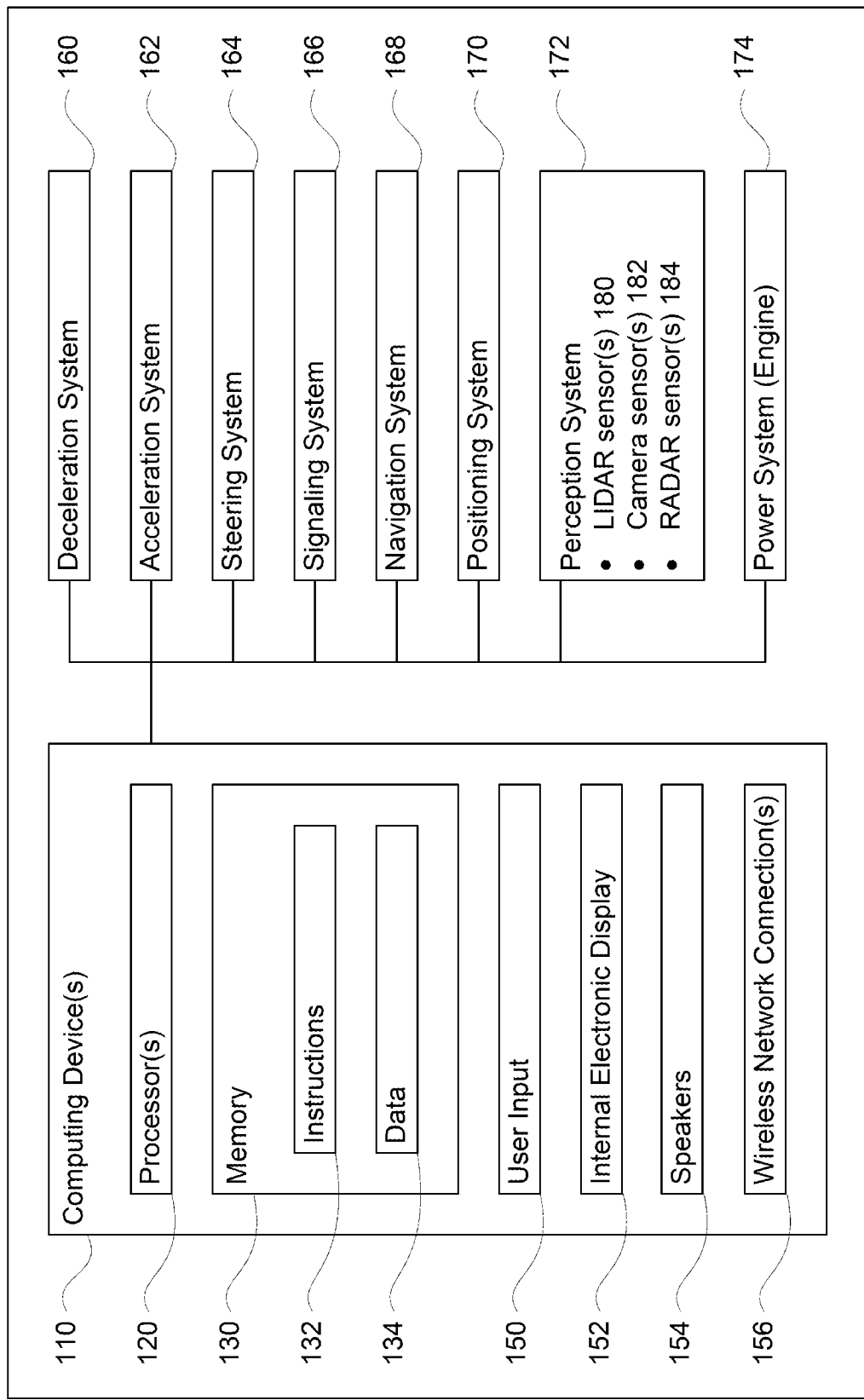
FIG. 1 is a functional diagram of an example vehicle in accordance with aspects of the disclosure.

The technology relates to performance checks for a vehicle to be performed after a full calibration, prior to operation, or at regular intervals. Before operating a vehicle on the road, a human driver may check various systems and components of the vehicle, such as making sure that the mirrors are adjusted, that the GPS system is functioning, and components such as steering wheel, brake, and signal lights, are responsive. Likewise, various systems of an autonomous vehicle also need to be checked before operation, particularly when the vehicle is to be operated in an autonomous mode, where a human driver may not be present to notice problems with the vehicle's systems. For instance, even if the vehicle had been fully calibrated in the past, a sensor in a perception system of the vehicle might have been moved during previous operation such as by another road user or a cleaner, or have been damaged by environmental factors such as temperature, humidity, etc.

As such, a plurality of performance checks may be performed on the vehicle including, for example, a sensor check, a map check, and/or a component check. The sensor check may include determining a level of function of a given sensor or detection system, such as detection accuracy, detection resolution, field of view, etc. The map check may include determining an accuracy of the map data in relation to a given geographic area. The component check may include determining a level of function of a given component, such as tire pressure, tire alignment, etc. The results of the plurality of performance checks may be used to determine what functions of the vehicle are within set guidelines, such as for safety and comfort. The results may also be used to designate or clear the vehicle for particular modes of operation.

To perform the plurality of performance checks, one or more computing devices may determine a test route based on the location of the vehicle, the map data, and the plurality of performance checks for the plurality of systems of the vehicle. The test route need not include a designated depot or testing center, or be a closed route.

The vehicle's computing devices may navigate the vehicle along the test route using the one or more components and collect data using the plurality of detection systems. Collecting the data may include using a detection system of the plurality of detection system to detect one or more traffic features or stationary objects along the test route. In addition, collecting the data may include detecting one or more measurements related to a component of the vehicle.

During the test route or after the vehicle completes the test route, the vehicle's computing devices may perform the plurality of performance checks by analyzing collected data. For a sensor check, characteristics of a detected traffic feature (such as location, orientation, shape, color, reflectivity, etc.) may be compared with previously detected or stored characteristics of the traffic feature. For a map check, a location or orientation of a detected traffic feature may be compared with the location or orientation of a previously detected or stored traffic feature in map data of the vehicle. For a component check, the one or more measurements related to a component of the vehicle may be compared with a threshold measurement.

Based on results from the plurality of performance checks, such as based on which performance checks have been satisfied, the vehicle's computing devices may select an operation mode for operating the vehicle. Operation modes may include, for example, task designations (passenger or non-passenger tasks), or limits on speeds, distance, or geographic area. Operation modes may also include an inactive mode, for example if the vehicle is not cleared for any other mode. In some implementations, modes may be selected for a plurality of vehicles by a remote system, such as a fleet management system. The vehicle may then be operated by the vehicle's computing devices in a particular mode based on the plurality of performance checks.

The features described above may allow autonomous vehicles to be quickly and properly prepared for operation. Quicker preparation means vehicles may be sent to users in a more timely fashion, even as demand fluctuates. As a result, users of autonomous vehicles may be able to be picked up in a timely manner. In addition, fewer resources, such as fuel, need be used in the preparation of the autonomous vehicle for service, which may reduce overall costs. The features also allow for management of an entire fleet of autonomous vehicles designated for a plurality of modes that may service users more efficiently and safely.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a drop-off location completely autonomously using data from the map data and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map data, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map data may store known traffic or congestion information and/or and transit schedules (train, bus, etc.) from a particular pickup location at similar times in the past. This information may even be updated in real time by information received by the computing devices 110.

Figure 2:
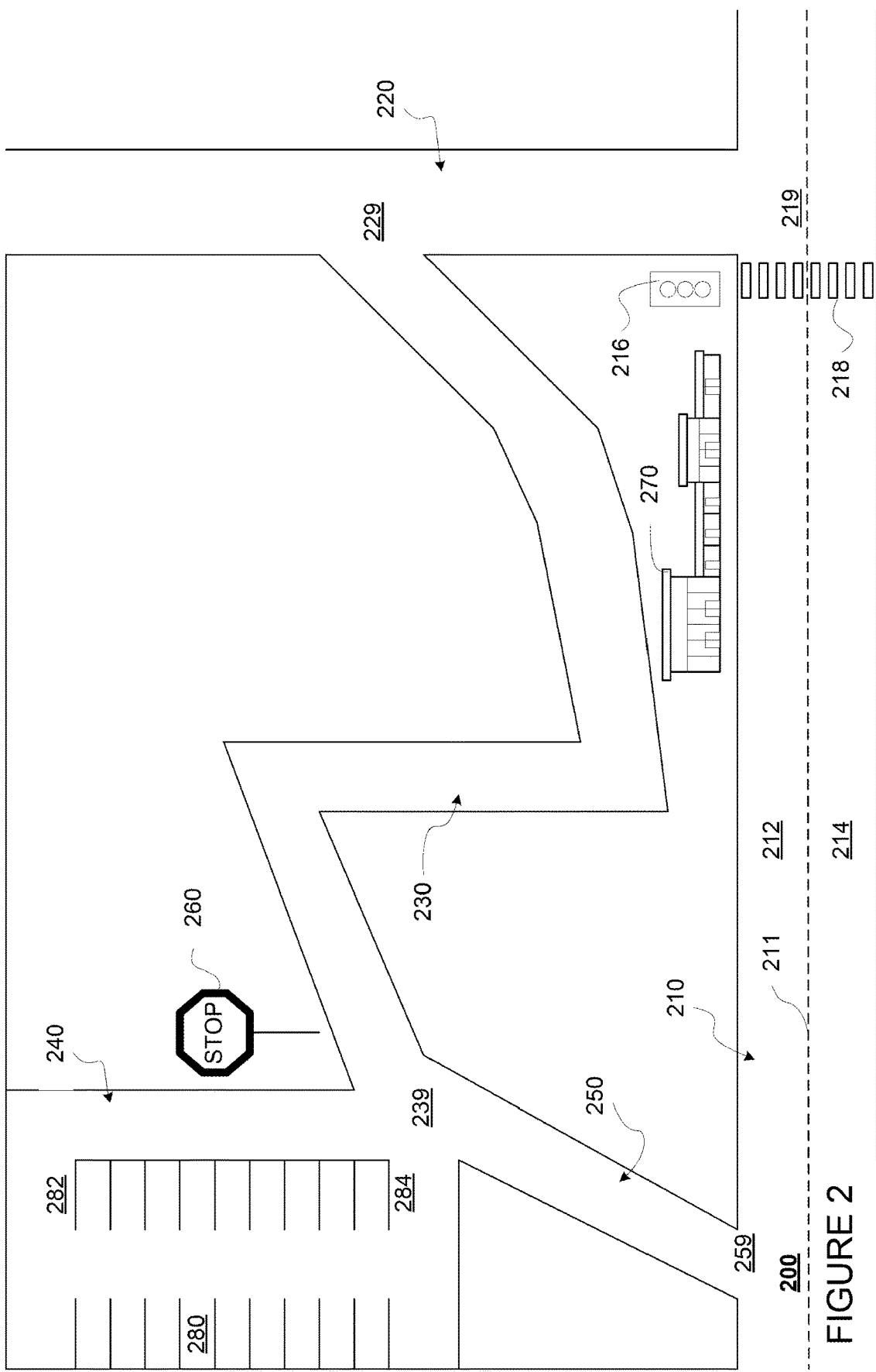
FIG. 2 is an example representation of map data in accordance with aspects of the disclosure.

FIG. 2 is an example of map data 200. As shown, the map data 200 includes the shape, location, and other characteristics of road 210, road 220, road 230, road 240, and road 250. Map data 200 may include lane markers or lane lines, such as lane line 211 for road 210. The lane lines may also define various lanes, for example lane line 211 defines lanes 212, 214 of road 210. As alternative to lane lines or markers, lanes may also be inferred by the width of a road, such as for roads 220, 230, 240, 250. The map data 200 may also include information that identifies the direction of traffic and speed limits for each lane as well as information that allows the computing devices 110 to determine whether the vehicle has the right of way to complete a particular type of maneuver (i.e. complete a turn, cross a lane of traffic or intersection, etc.).

Map data 200 may also include relationship information between roads 210, 220, 230, 240, and 250. For example, map data 200 may indicate that road 210 intersects road 220 at intersection 219, that road 220 intersects road 230 at intersection 229, that roads 230, 240, and 250 intersect at intersection 239, and that road 250 intersects road 210 at intersection 259.

Map data 200 may further include signs and markings on the roads with various characteristics and different semantic meanings. As shown, map data 200 includes traffic light 216 for road 210 and pedestrian crossing 218 across road 210. Map data 200 also includes stop sign 260. The map data 200 may additionally include other features such as curbs, waterways, vegetation, etc.

In addition, map data 200 may include various buildings or structures (such as points of interests) and the type of these buildings or structures. As shown, map data 200 depicts building 270 on road 210. For example, map data 200 may include that the type of the building 270 is an airport, train station, stadium, school, church, hospital, apartment building, house, etc. In this regard, the type of the building 270 may be collected from administrative records, such as county records, or manually labeled by a human operator after reviewing aerial images. Map data 200 may include additional information on building 270, such as the locations of entrances and/or exits.

Map data 200 may also store predetermined stopping areas, such as a parking lot 280. In this regard, such areas may be hand-selected by a human operator or learned by a computing device over time. Map data 200 may include additional information about the stopping areas, such as the location of entrance 282 and exit 284 of parking lot 280, and that entrance 282 connects to road 240, while exit 284 connects to roads 230 and 250.

In some examples, map data 200 may further include zoning information. For instance, the zoning information may be obtained from administrative records, such as county records. As such, information on the roads may include indication that it is within a residential zone, a school zone, a commercial zone, etc.

The map data may further include location coordinates (examples of which are shown in FIG. 7), such as GPS coordinates of the roads 210, 220, 230, 240, and 250, intersections 219, 229, 239, and 259, lane line 211, lanes 212 and 214, traffic light 216, pedestrian crossing 218, stop sign 260, building 270 and its entrance 272, parking lot 280 and its entrance 282 and exit 284.

Although the detailed map data is depicted herein as an image-based map, the map data need not be entirely image based (for example, raster). For example, the detailed map data may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensor(s) 180, camera sensor(s) 182, and RADAR sensor(s) 184. The perception system 172 may include other sensors, such as SONAR device(s), gyroscope(s), accelerometer(s), and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
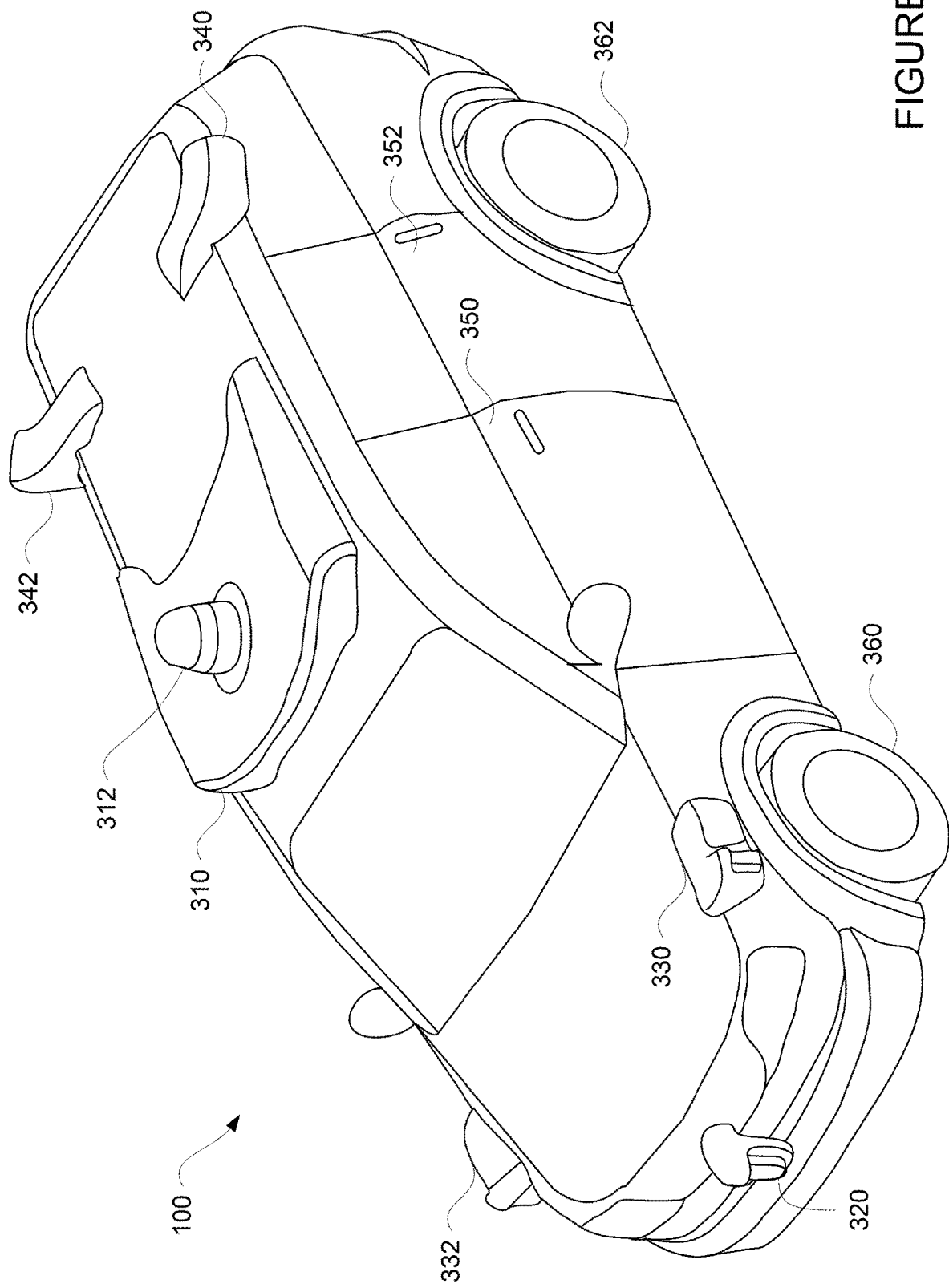
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and RADAR units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for RADAR units and/or cameras also located on the roof of vehicle 100. Additional RADAR units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing devices 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

For instance, sensor data (examples of which are shown in FIG. 7) collected by one or more sensors of the perception system 172 may be stored in data of computing device 110 of vehicle 100. Referring to FIG. 2, vehicle 100 may have driven past stop sign 260 in the past, and have stored the detected values of stop sign 260 by LIDAR sensor(s) 180 in data 134 of memory 130. In this example, the detected values may include, for example, that when vehicle 100 is at location [x_b, y_b] (which may for example correspond to driving in road 230 towards intersection 239 and was 10$m$ away from reaching intersection 239), the stop sign 260 was detected to be at location [x4, y4] and at a 30° angle from a front of vehicle 100 (which may for example correspond to when vehicle 100 is 8 m away from stop sign 260 on road 230 driving towards intersection 239). As described in detail below with respect to the example methods, these stored sensor data may be used for performance checks on the various systems of the vehicle 100. In other examples, sensor data collected by the perception system of a reference vehicle may be stored in computing device 110 of vehicle 100. In other examples, such sensor data may be stored remotely on a server or a storage system.

Computing device 110 may further store threshold values (some of which are shown in FIG. 8) for various components of vehicle 100. For example, computing device 110 may store a threshold minimum tire pressure for tires of vehicle 100. For another example, computing device 110 may store threshold alignment angles for tires of vehicle 10. For yet another example, computing device 110 may store a threshold stopping distance at a particular speed for a brake of vehicle 100.

Figure 4:
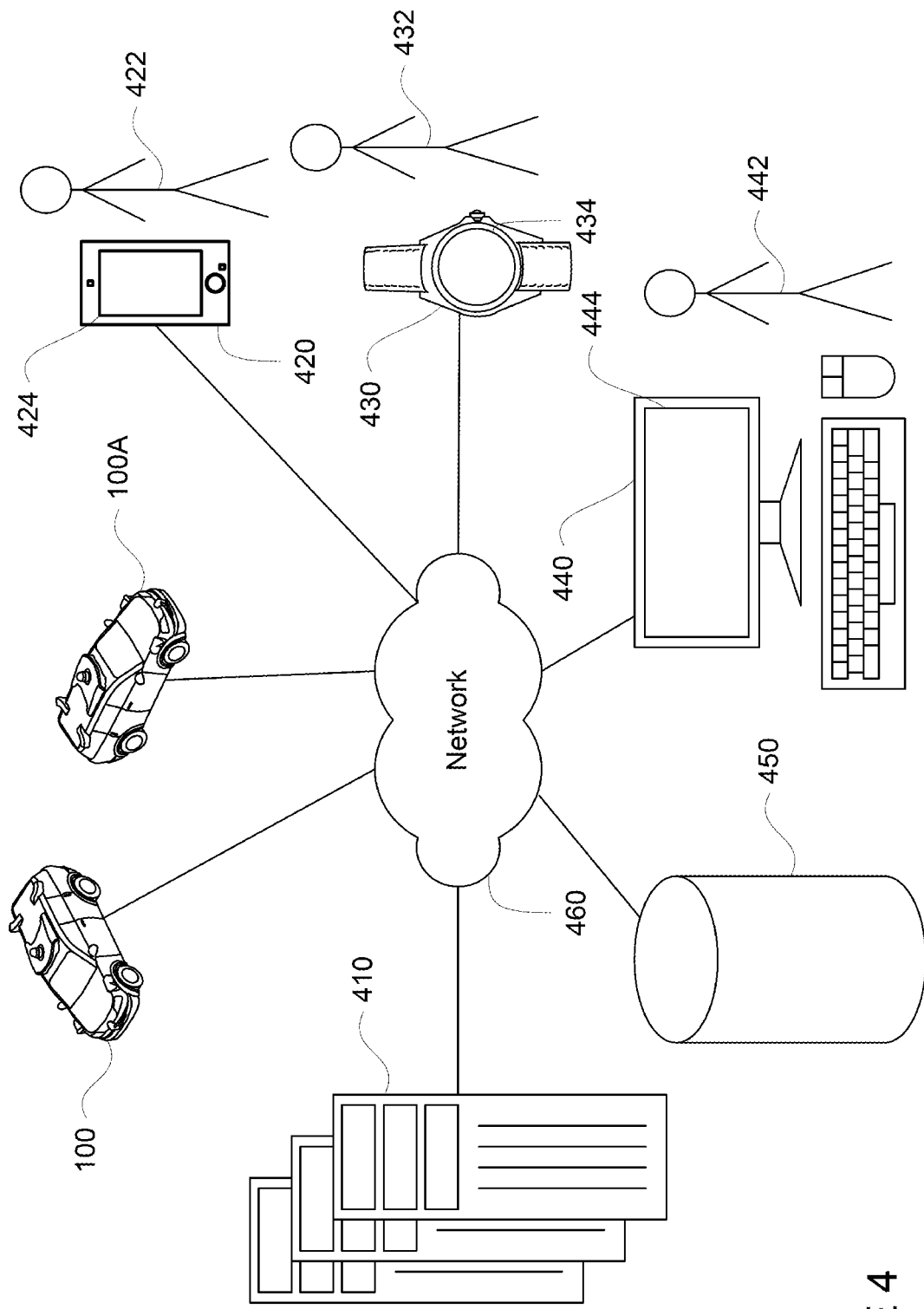
FIG. 4 is an example pictorial diagram of a system in accordance with aspects of the disclosure.
Figure 5:
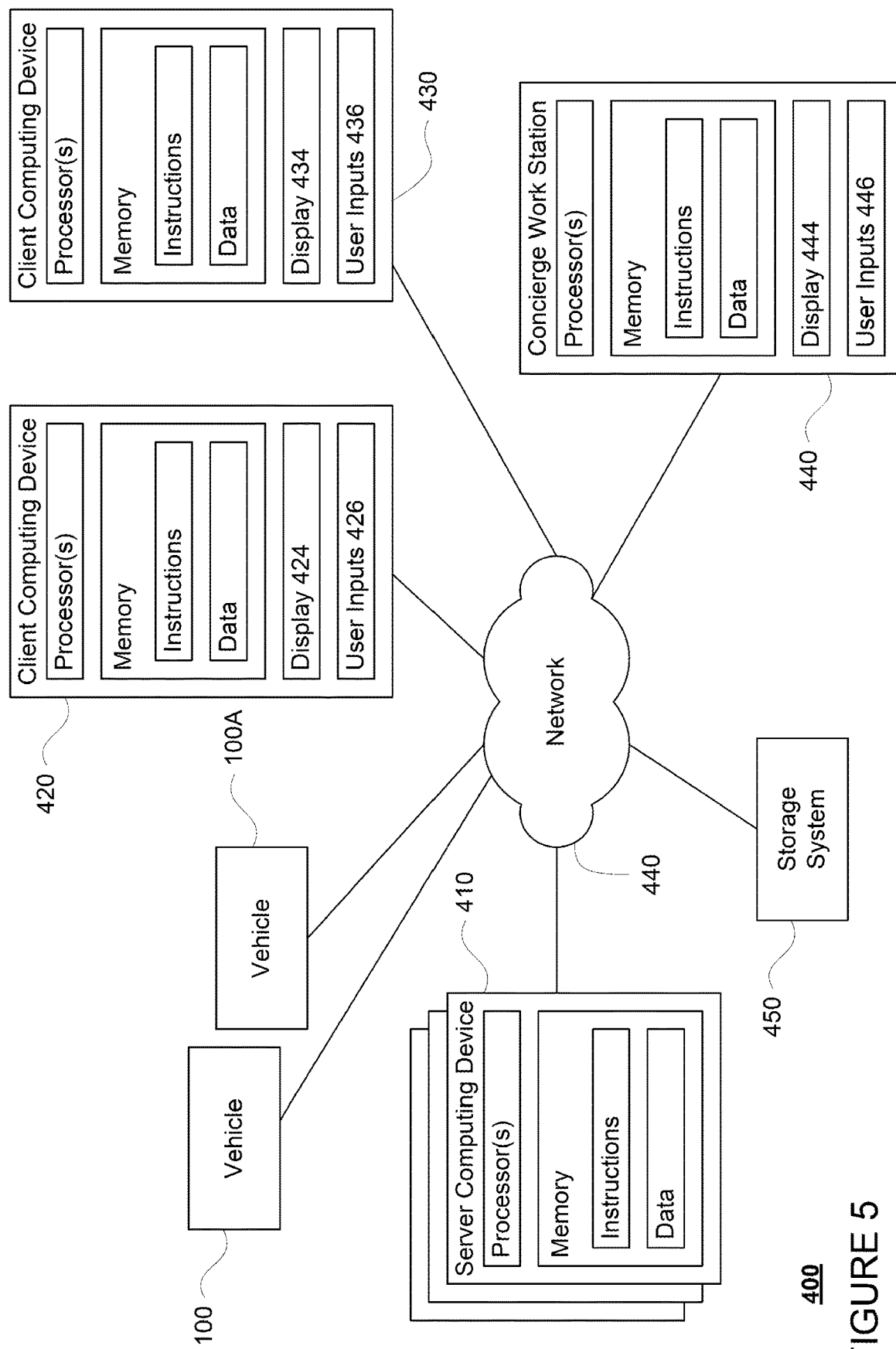
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

As mentioned above, rather than saving sensor data detecting various traffic features on computing device 110, such sensor data may additionally or alternatively be stored on server computing device 410. Likewise, threshold values for components of vehicle 100 may likewise be stored on server computing device 410.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). A user, such as user 422, 432, 442, may send information, such as pickup or drop-off requests, to server computing devices 410, using user input devices 426, 436, 446 of computing devices 420, 430, 440. The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 450 may also store routing data for generating and evaluating routes between locations. For example, the routing information may be used to estimate how long it would take a vehicle at a first location to reach a second location. In this regard, the routing information may include map data, not necessarily as particular as the detailed map data 200 described above, but including roads, as well as information about those road such as direction (one way, two way, etc.), orientation (North, South, etc.), speed limits, as well as traffic information identifying expected traffic conditions, etc.

As mentioned above, rather than saving sensor data detecting various traffic features on computing device 110 or server computing device 410, such sensor data may additionally or alternatively be stored on storage system 450. Likewise, threshold values for components of vehicle 100 may likewise be stored on storage system 450.

The storage system 450 may also store information which can be provided to client computing devices for display to a user. For instance, the storage system 450 may store predetermined distance information for determining an area at which a vehicle is likely to stop for a given pickup or drop-off location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

Figure 6:
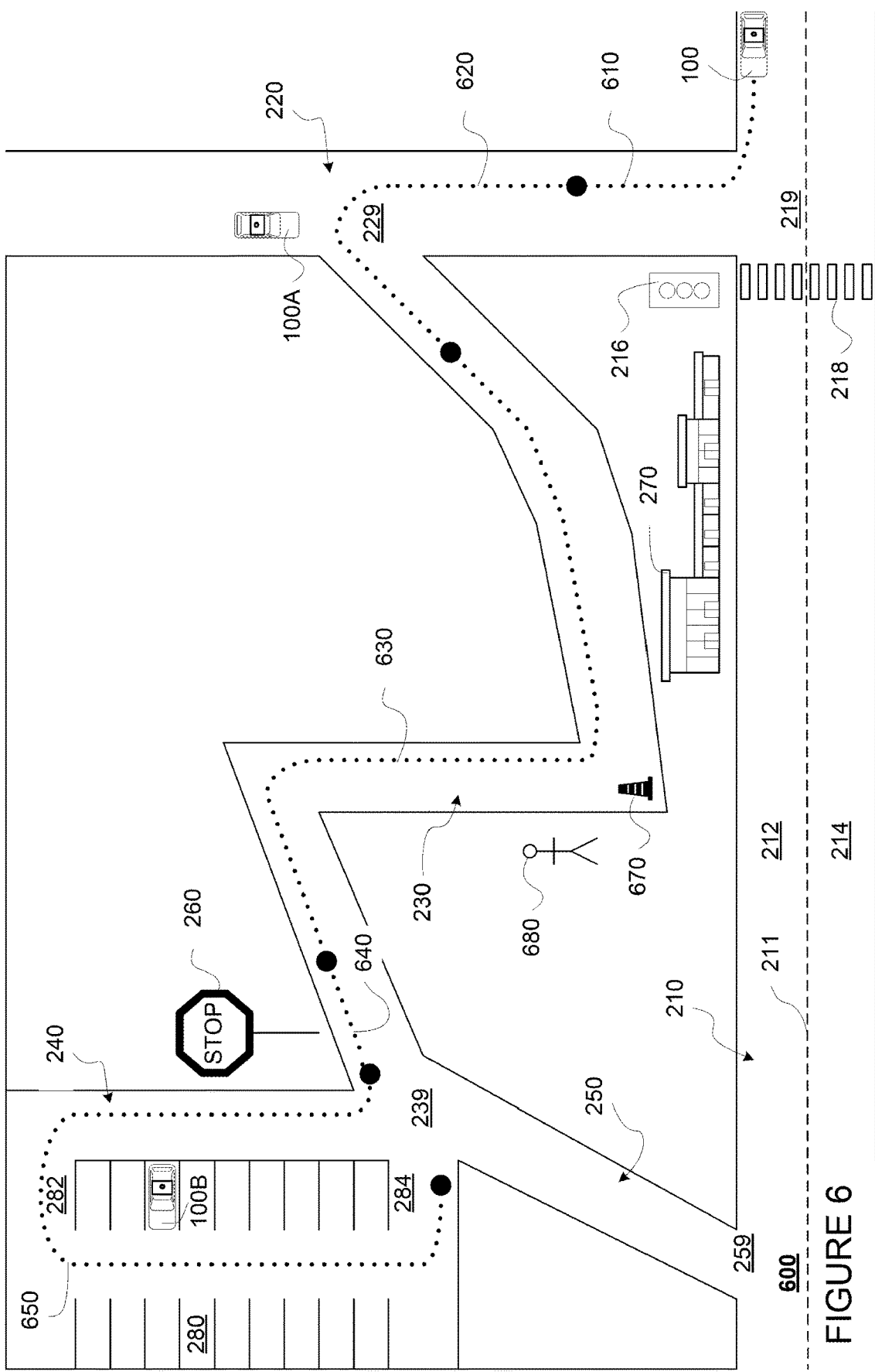
FIG. 6 is an example situation in accordance with aspects of the disclosure.

In addition to the systems described above and illustrated in the figures, various operations will now be described. It should be understood that the following operations do not have to be performed in the precise order described below. Rather, various steps can be handled in a different order or simultaneously, and steps may also be added or omitted FIG. 6 illustrates an example situation 600 for performing a plurality of performance checks on vehicle 100. Various features in FIG. 6 may generally correspond to the shape, location, and other characteristics of features shown in map data 200 of FIG. 2, and labeled as such. Additional features in FIG. 6, including various road users and other objects, are described in detail below. Although these examples are useful for demonstration purposes, they should not be considered limiting.

As shown in FIG. 6, vehicle 100 is currently parked curbside in lane 212 of road 210, to ensure safe operation on the road, vehicle 100 may need to perform performance checks on its systems. In this regard, vehicle 100 may be scheduled to perform the performance checks on its systems on a regular basis, such as every day or week, every predetermined number of kilometers traveled or numbers of trips completed, or some frequency mandated by law. For example, during a previous day, vehicle 100 might have completed a number of trips, and upon completing these trips, vehicle 100 has parked roadside by the curb in lane 212. On the current day, before going on more trips, vehicle 100 may first perform a plurality of performance checks on its various systems. In one instance, some types of performance checks may be performed at higher frequency than other performance checks. In another instance, the frequency of the performance checks may depend on the type of vehicle.

In order to perform the plurality of performance checks on the vehicle, a test route may be determined. In this regard, computing device 110 may determine the test route based on a location of the vehicle, map data, and the types of performance checks to be performed. For instance, computing device 110 may determine that vehicle 100 is currently parked by the curb in lane 212 near intersection 219, and determine, based on map data 200, a test route nearby so that vehicle 100 does not need to drive to a designated depot or testing center just to perform these tests. This ensures that the performance checks are performed as soon as possible, instead of risking operating the vehicle 100 on a long drive to the designated testing center, and ensures a more efficient use of resources, including fuel.

Computing device 110 may determine the test route further based on the types of performance checks that need to be performed in order to complete the plurality of performance checks. For instance, a list of required performance checks, including the type of each required performance check and frequency for each required performance check, may be stored on computing device 110. Additionally or alternatively, the list of required performance checks may be stored on server computing device 410 and/or storage system 450 accessible by computing device 110. For example, the list of required performance checks may include items such as "perform a sensor check using a stored traffic light detection at least once per 24 hours," "perform a map check using a stop sign stored in map data at least once per month," "perform a component check on all four tires at least once per week," etc. In one aspect, computing device 110 may select a plurality of segments, such as a plurality of road segments, using map data and stored sensor data, where each of the plurality of road segments is selected for performing one or more of the required performance checks. Computing device 110 may then connect the plurality of road segments, and connect the location of the vehicle to one of the plurality of road segments to determine a test route in order to allow the vehicle to perform the plurality of performance checks.

For instance, for a sensor check, computing device 110 may select a segment for a test route so that sensor data can be collected to compare with stored values of previous detections of traffic features or stationary objects. For example, as shown in FIG. 6, computing device 110 may determine that traffic light 216 and pedestrian crossing 218 nearby vehicle 100 are stored as previously detected traffic features near vehicle 100. As such, a sensor check on one or more detection systems may be performed by comparing newly detected values to these stored values. Therefore, computing device 110 may determine that segment 610 beginning at the current location of vehicle 100 and a right turn from lane 212 to road 220 may be used for performing the sensor check.

For a map check, computing device 110 may select a segment for a test route so that sensor data can be collected to compare with stored locations and/or orientations of traffic features or stationary objects in map data. For example, as shown in FIG. 6, computing device 110 may determine that stop sign 260 is stored in map data 200 as a traffic feature. As such, a map check on the map data 200 stored in navigation system may be performed by comparing newly detected location and orientation of the stop sign 260 with the stored location and/or orientation of the stop sign 260 in map data 200. Therefore, computing device 110 may determine that segment 640 including a portion of road 230 near stop sign 260 may be used for performing the map check.

For a component check, computing device 110 may select a segment for a test route where a particular vehicle maneuver may be performed. For example, as shown in FIG. 6, computing device 110 may determine that a left turn may be performed at intersection 229. As such, a component check on the brake, wheel alignment, and left turn signal may be performed at intersection 229 while vehicle 100 performs the left turn. Therefore, computing device 110 may determine that segment 620 including a portion of road 220 and a left turn at intersection 229 to road 230 can be used for performing the component check.

In some instances, computing device 110 may determine that more than one segment is needed for performing a particular type of performance check. In this regard, a human operator may manually a list of items for a test route. Alternatively or additionally, a list of items required for a test route may be stored on computing devices 110, and/or stored on server computing device 410 and/or storage system 450 accessible by computing device 110. For example, the list of items required for a test route may include items such as "five or more traffic lights on the test route," "one multipoint turn on the test route," etc. For example, as shown in FIG. 6, computing device 110 may determine that a component check for the reverse signal requires maneuvers such as back-in or parallel parking or multi-point turns. As such, computing device may determine that segment 650 including parking lot 280 may be used for performing the component check on the reverse signal.

In other instances, the segments of test routes selected for each type of performance check may be the same or have overlapping portions, or in other words, a given segment may be used for performing multiple types of performance checks. For example, in addition for sensor check, segment 610 may also be used for map check, since the location and/or orientation of traffic features such as traffic light 216 and pedestrian crossing 218 are stored in map data 200. For another example, segment 610 may also be used for a component check on the brake, wheel alignment, and right turn signal.

Computing device 110 may select additional segments of test route connecting the various segments selected for the particular types of performance checks. For example, computing device 110 may determine that segment 630 may be needed to connect segment 620 and segment 640. As such, an example test route may include segments 610, 620, 630, 640, and 650.

Further, where applicable, computing device 110 may store the corresponding or associated performance checks to be performed using sensor data from each segment of the test route. For example, computing device 110 may associate segment 610 with a sensor check, a map check using traffic light 216, pedestrian crossing 218, and a component check on wheel alignment and right-turn signal. For another example, computing device 110 may associate segment 620 with a component check on left-turn signal and wheel alignment. For still another example, computing device 110 may associate segment 640 with a sensor check and a map check using stop sign 260. For yet another example, computing device 110 may not associate any check with segment 630.

Computing device 110 may determine the test route further based on additional requirements for test routes. One example requirement may be that one or more segments of the test route must have below a threshold traffic volume. In this regard, computing device 110 may receive historical or real-time traffic data from a database. Another example requirement may be that one or more segments of the route must have a speed limit below or above a threshold speed limit. In this regard, computing device 110 may determine speed limits of various roads based on map data 200. Yet another example requirement may be that one or more segments of the route must not be performed in certain areas, such as a school zone. In this regard, computing device 110 may determine zoning information based on map data 200. Still another example requirement may be that particular types of maneuvers must be performed in a parking lot. For example, as shown in FIG. 6, although multi-point turn maneuvers may also be performed on road 230, parking lot 280 may be chosen based on a requirement that multi-point turns be made in parking lots. Additional example requirements may be that the test route must include multiple distinct traffic lights, one or more cul-de-sacs for performing multipoint turns, and a stored traffic feature in a designated depot or testing center for the vehicle 100.

The test route need not be a closed loop. For example, as shown in FIG. 6, computing device 110 may determine to go on a next segment at the end of segment 650, instead of returning to the beginning of the test route. In other examples, the test route may be a closed loop, for example, computing device 110 may determine an additional segment connecting the end of segment 650 back to the beginning of segment 610. In examples where the test route is a closed loop, the plurality of performance checks may be repeated in order to collect more sets of sensor data, which for example may be averaged to obtain more accurate results.

The test route may be stored so that the test route can be used again by the vehicle at a later time to perform the aforementioned checks. For instance, the test route described above may be stored, and if vehicle 100 happens to be around the area when the plurality of performance checks need to be performed again, computing device 110 may simply use the stored test route, instead of determining a new test route. For another instance, based on the performance checks need to be performed again, computing device 110 may use some but not all the segments of the stored test route.

Once the test route is determined, computing device 110 may control the vehicle 100 to drive along the test route. While doing so, the perception system 172 and/or computing devices 110 may collect data while on the test route including sensor data and component data in order to perform the aforementioned performance checks. For example, FIG. 7 shows example sensor data 700 collected by various sensors in the perception system 172 while vehicle 100 drives along the test route shown in FIG. 6. For another example, FIG. 8 shows example components data 800 collected from various components while vehicle 100 drives along the test route shown in FIG. 6.

Referring to FIGS. 6 and 7, the collected sensor data may include data on permanent traffic features or stationary objects, such as traffic light 216, pedestrian crossing 218, building 270, stop sign 260, and parking lot 280. As shown in FIG. 7, the sensor data may include information such as the detected location and orientation of each traffic feature or object, as well as the location of the vehicle 100 when the sensor data on that feature or object is taken. For example, while on the test route, when vehicle 100 is at location [x_a, y_a], LIDAR sensor(s) 180 of vehicle 100 may detect traffic light 216 at location [x1, y1] and at an angle 25° from vehicle 100, and building 270 at location [x3, y3] and at an angle 10° from vehicle 100. For another example, while still on the test route, when vehicle 100 is at location [x_b, y_b], LIDAR sensor(s) 180 of vehicle 100 may detect stop sign 260 at location [x4, y4] and at an angle 25° from vehicle 100, and parking lot 280 at location [x5, y5] and at an angle 25° from vehicle 100. Locations of vehicle 100 during the test route may be determined by navigation system 168. Although not shown, the LIDAR data may further include details such as the size and shape of these features or objects.

The stored sensor data may include information such as the previously detected location and orientation of each traffic feature or object. In this regard, the stored sensor data for a traffic feature or object may include previous detections of the traffic feature or object by sensors of the vehicle 100 in the past. The stored sensor data for a traffic feature or object may additionally or alternatively include previous detections of the traffic feature or object made by sensors of other vehicles. Further, the stored sensor data may include the location of the vehicle taking the sensor data when the traffic feature or object was detected. The stored sensor data may be stored on computing device 110. Additionally or alternatively, the stored sensor data may be stored on server computing device 410 and/or storage system 450 accessible by computer device 110.

Although not shown, stored sensor data and collected sensor data may include same type of sensor data taken by multiple sensors, such as by different LIDAR sensors mounted at different locations in or on vehicle 100. Further, stored sensor data and collected sensor data may include different types of sensor data, such as camera data. Each type of sensor data may include similar information as LIDAR data, such as detected location and orientation of each traffic feature or object, and the location of the vehicle 100 when the sensor data on that feature or object is taken. In addition, each type of sensor data may include further details such as the size, shape, color of these features or objects.

Although not shown, the collected sensor data may further include data on temporary or moving traffic features and/or objects, such as vehicle 100A, vehicle 100B, traffic cone 670 and pedestrian 680. For example, while at location [x_c, y_c] of the test route, LIDAR sensor(s) 180 of vehicle 100 may detect vehicle 100A at location [x6, y6] at a 15° angle from the front of the vehicle 100. At or around the same time, camera sensor(s) 182 and RADAR sensor 184 may also each detect vehicle 100A at location [x6, y6] at a 15° angle. For example, the camera data may further include the color of vehicle 100A, and RADAR data may further include speed of vehicle 100A.

Referring to FIGS. 6 and 8, component data may be collected on various components of vehicle 100. For example as shown in FIG. 8, tire pressures may be collected for all four tires of vehicle 100. For another example, wheel alignment data may be collected on all four wheels of vehicle 100. The wheel alignment data may include camber angle, caster angle, and toe angle for each wheel. For still another example, data on brake of vehicle 100 may be collected. For instance, stopping distance at a specific speed such as 100 km/hr may be measured. For yet another example, responsiveness of various lights, such as the turn and reverse signals, as well as night light, can be turned on and off.

During or after the vehicle completes the test route, the plurality of performance checks may be performed by analyzing the collected data. Computing devices 110 may perform the plurality of performance checks by analyzing the collected data in real time while vehicle 100 navigates through the test route, or store the collected data in memory 130 so that computing device 110 may perform the checks after completing the test route. Additionally or alternatively, the collected data may be uploaded to server computing device 410 or storage system 450 so that server computing device 410 may perform the plurality of performance checks. Having computing device 110 perform the checks may provide greater efficiency, since uploading collected data to server computing device 410 or storage system 450 may be time consuming.

For a sensor check, detected characteristics of a traffic feature or object collected during the test route may be compared with previously detected or stored characteristics of the traffic feature or object. A sensor may satisfy the sensor check when the characteristics collected during the test route match the previously detected or stored characteristics by the same sensor, and not satisfy the sensor check when the characteristics collected during the test route do not match the previously detected or stored characteristics. For instance, referring to FIG. 7, collected LIDAR data from LIDAR sensor(s) 180 may be compared to stored LIDAR values from a previous detection by LIDAR sensor(s) 180. For example, computing device 110 may determine that detected location for each of traffic light 216, building 270, stop sign 260 and parking lot 280 are identical to stored LIDAR values, but detected orientation of each is offset by a 5° angle. As such, computing device 110 may determine that LIDAR sensor(s) 180 does not satisfy the sensor check.

FIG. 9 shows an example situation 900 illustrating an example sensor check. Various features in FIG. 9 may generally correspond to the shape, location, and other characteristics of features shown in map data 200 of FIG. 2, and labeled as such. Additional features in FIG. 9, including various road users and other objects, are described in detail below. Although these examples are useful for demonstration purposes, they should not be considered limiting.

As shown in FIG. 9, while vehicle 100 is at location [x_b, y_b], LIDAR sensor(s) 180 detects stop sign 260 at a location [x4, y4] and orientation of 25° angle with respect to a front right corner of vehicle 100. However, the stored LIDAR values for the stop sign 260 include location [x4, y4] and orientation of 30° angle with respect to a front right corner of vehicle 100. This may be due to a movement of the LIDAR sensor(s) 180 from its previous position when the stored LIDAR values were taken. For example, a pedestrian might have accidentally touched the LIDAR sensor(s) 180 when passing by vehicle 100 while vehicle 100 was parked curbside in lane 212. As such, this rotation causes a −5° angle offset for all detections made by LIDAR sensor(s) 180.

Additionally or alternatively, computing device 110 may compare the location and/or orientation of traffic features and/or objects detected in the collected sensor data with the location and/or orientation of traffic features and/or objects stored in map data 200. For example as shown in FIG. 7, computing device 110 may compare location [x1, y1] for traffic light 216 detected in collected LIDAR data with location [x1, y1] stored in map data 200, compare location [x3, y3] for building 270 detected in collected LIDAR data with location [x3, y3] stored in map data 200, compare location [x4, y4] for stop sign 260 detected in collected LIDAR data with location [x4, y4] stored in map data 200, compare location [x5, y5] for parking lot 280 detected in collected LIDAR data with location [x5, y5] stored in map data 200, and conclude that LIDAR sensor(s) 180 pass the sensor check. In this regard, computing device 110 may compare collected sensor data with map data 200 for some or all traffic features and/or objects detected during the test route.

In some instances, computing device 110 may determine that a sensor may still pass a sensor test if the differences between the stored and collected sensor data are within a predetermined range. For instance, computing device 110 may determine that LIDAR sensor(s) 180 may still pass the sensor test if the difference in stored and detected orientation for a detected object is within a 10° range.

Computing device 110 may determine one or more corrections for one or more sensors that fails the sensor test. For example, for LIDAR sensor(s) 180, computing device 110 may determine a +5° correction for all orientation values detected by LIDAR sensor(s) 180. For instance, computing device 110 may add 5° to the detected 25° angle for stop sign 260.

Another sensor check may include comparing collected sensor data from various sensors of a same type for a detected object. For instance, if LIDAR sensor(s) 180 include multiple sensors have overlapping fields of views, computing device 110 may compare the LIDAR point cloud for traffic light 216 collected by a first sensor with the LIDAR point cloud for traffic light 216 collected by a second sensor. Such sensor error of the second sensor may be caused by any of a number of factors, such as damage by another road user, or due to environmental factors such as extreme temperature or humidity. Computing device 110 may determine that, if the two LIDAR point clouds match substantially, such as by 90% or some other threshold, then both the first and second sensors pass the sensor check.

Still another sensor check may include determining a resolution or field of view captured by a sensor. For example, if collected LIDAR data for LIDAR sensor(s) 180 has a smaller field of view than the stored LIDAR data, computing device 110 may further determine that LIDAR sensor(s) 180 has failed the sensor check. In some instances, computing device 110 may determine that LIDAR sensor(s) 180 may still pass the sensor test if the difference between field of view of the collected LIDAR data during test route and field of view of the stored LIDAR data is within a predetermined threshold difference. For another example, if collected camera data for camera sensor(s) 182 has a lower resolution than the stored camera data, computing device 110 may further determine that camera sensor(s) 182 has failed the sensor check. In some instances, computing device 110 may determine that camera sensor(s) 182 may still pass the sensor test if the difference between resolution of the collected camera data during test route and resolution of stored camera data is within a predetermined threshold difference. Such changes in resolution or field of view may be caused by any of a number of factors, such as damage by another road user, or due to environmental factors such as extreme temperature or humidity.

Yet another sensor check may include determining whether a sensor produces unreasonable sensor data. For example, computing device 110 may determine that camera data produced by camera sensor(s) 182 are all green, and conclude that camera sensor(s) 182 fail the sensor check. For another example, computing device 110 may determine that LIDAR sensor(s) 180 produces empty point clouds, and conclude that LIDAR sensor(s) 180 fail the sensor check. Such changes in resolution or field of view may be caused by any of a number of factors, such as damage by another road user, or due to environmental factors such as extreme temperature or humidity.

For another instance, for a map check, a location or orientation of a detected traffic feature may be compared with the location and/or orientation of a previously detected or stored traffic feature stored in map data of the vehicle. The map data may satisfy the map check when the location and/or orientation of detected traffic features during the test route match the location and/or orientation of traffic feature stored in the map data. For instance, referring to FIG. 7, locations of traffic features detected by LIDAR sensor(s) 180 may be compared to locations stored in map data 200. For example, computing device 110 may determine that detected location by LIDAR sensor(s) 180 for each of traffic light 216, building 270, stop sign 260 and parking lot 280 are identical to locations stored in map data 200, but that pedestrian crossing 218 is not detected by LIDAR sensor(s) 180.

When a difference between the map data 200 and collected sensor data on a traffic feature is detected, computing device 110 may further determine whether the difference was due to an error in the map data 200 or an error in the collected sensor data. For example, computing device 110 may determine that, since pedestrian crossing is not a 3D structure and that the field of view of LIDAR sensor(s) 180 does not include ground level, LIDAR sensor(s) 180 cannot detect pedestrian crossing 218, and therefore the difference does not indicate an error in map data 200. In such cases, computing device 110 may further confirm by comparing the location stored in map data 200 with collected sensor data from another sensor, such as camera sensor(s) 182. For example, computing device 110 may determine that the location for pedestrian crossing 218 in map data 200 matches the location detected by camera sensor(s) 182.

In some instances, computing device 110 device may determine that an update needs to be made for map data 200. Referring to FIG. 9, which shows the example situation 900 further illustrating an example map check. As shown, while at location [x_b, y_b], LIDAR sensor(s) 180 of vehicle 100 detects a no-enter sign 910 near exit 284 of parking lot 280. However, map data 200 does not include data on a no-enter sign at this location. As such, computing device 110 may determine to update map data 200 with the detected location of no-enter sign 910.

In addition or alternatively, computing device 110 may determine that, even if some error exists, the map data may still pass a map test if a threshold number or percentage of traffic features stored in the map data have locations matching the detected locations from the collected sensor data. For instance, computing device 110 may determine that map data 200 may still pass the map test if at least five or at least 80% of the stored features have locations matching the collected sensor data. For example, since locations for traffic light 216, pedestrian crossing 218, building 270, stop sign 260, and parking lot 280 match that of collected LIDAR data, even though location for the no-enter sign 910 was missing, computing device 110 may still determine that map data 200 may pass the map test.

For another instance, for a component check, the one or more measurements related to a component of the vehicle may be compared with predetermined requirements. The component may satisfy the component check when the one or more measurements satisfy predetermined requirements. For example, the predetermined requirements may be stored in computing device 110, or alternatively or additionally stored on server computing device 410 and/or storage system 450.

In some instances, a component may satisfy a component check if a measurement meets a predetermined threshold value. For example, referring to FIG. 8, a predetermined minimum threshold of 35 psi may be stored for tires of vehicle 100. As shown, since the front left tire, the rear left tire, and the rear right tire each meets the predetermined minimum threshold, these tires satisfy the component check. However, since front right tire has a pressure of only 20 psi, the front right tire fails the component check.

Additionally of alternatively, a component may satisfy a component check if a measurement is within a predetermined range of values. For example, referring to FIG. 8, predetermined alignment angles may be set for the tires of vehicle 100, which include camber, caster, and toe angles. Since each of the tires of vehicle 100 have alignment angles within these predetermined ranges, each of the tires of vehicle 100 passes the component check.

Additionally of alternatively, a component may satisfy a component check if a measurement indicates that the component has a predetermined level of responsiveness. For example, referring to FIG. 8, the predetermined level of responsiveness may be set as a binary (responsive or not) for each of the left turn, right turn, reverse, and brake signal lights, as well as the headlight. As shown, since left turn, right turn, reverse, and brake signal lights are all responsive, computing device 110 may determine that they each pass the component check. However, since headlight is unresponsive, computing device 110 may determine that the headlight fails the component check.

For another example, again referring to FIG. 8, the predetermined level or responsiveness may be set as a predetermined level of delay. As shown, for the brake, a predetermined stopping distance at a specific speed, such as 100 km/hr, may be set for vehicle 100. As such, since the measured stopping distance for vehicle 100 is 19 m, which is below the predetermined stopping distance of 20 m, computing device 110 may determine that the brake passes the component check.

Once the plurality of performance checks are completed, computing devices 110 may select an operation mode for vehicle 100. Modes for operation may include, for example, task designations (passenger or non-passenger tasks). Modes of operation may further include various limits, such as limits on speeds, distance, geographic area, or environmental conditions (such as weather, day/night). Modes for operation may also include an inactive mode where the vehicle is pulled over or parked after completing the plurality of performance checks.

Computing device 110 may determine an operation mode based on results from the plurality of performance checks. For example, an operation mode may only be selected if a threshold number of percentage of performance checks are passed. For another example, an operation mode may only be selected if a specific set of performance checks are passed, such as a set of performance checks specific to driving at night or during poor visibility, which may include performance checks such as the sensor checks described above, and component checks involving signal lights and headlight, etc.

Computing device 110 may determine that one or more operation modes cannot be selected based on specific failures. For example, computing device 110 may determine that, if stopping distance at 100 km/hr for vehicle 100 is above 20 m, modes of operation involving driving at a speed of 100 km/hr or greater cannot be selected. For another example, computing device 110 may determine that, if less than 80% of the sensors in the perception system 172 fail the sensor test, operation mode involving driving at night or certain weather conditions cannot be selected. For still another example, computing device 110 may determine that, if one or more tires has a tire pressure below 35 psi, modes of operation involving passenger tasks cannot be selected.

Computing device 110 may select an operation mode further based on other factors, such as traffic law requirements and the type of vehicle. For example, traffic law may require a vehicle to have operating turn signals. As such, computing device 110 may select the inactive mode if any of the turn signals is unresponsive. For another example, computing device 110 may select an operation mode with a limit on distance only for compact vehicles with below normal tire pressures, and select an inactive operation mode for trucks with below normal tire pressures.

Once an operation mode is selected, computing device 110 may operate vehicle 100 in the selected operation mode. For example, operating in the selected operation mode may include operating according to limits of the mode of operation, such as limits on speed, distance, geographic area, environmental condition. For another example, operating in the selected mode may include whether to determining whether to accept passenger or non-passenger tasks.

Operating in the selected operation mode may further include using the determined corrections for one or more sensors. For example, as described with respect to FIGS. 7 and 9, when operating vehicle 100, computing device 110 may apply a correction of +5° to sensor data detected by LIDAR sensor(s) 180.

Operating in the selected operation mode may further include using the updated map data. For example, as described with respect to FIGS. 7 and 9, when operating vehicle 100, computing device 110 may use updated map data 200 including the no-enter sign 910.

Operation modes may also be selected for a plurality of vehicles by a remote system, such as a fleet management system. For example, server computing device 410 may manage a fleet of vehicles including vehicle 100, 100A, 100B. In this regard, sensor data and component data collected by various vehicles in the fleet, such as vehicle 100, 100A, 100B may be uploaded to server computing device 410. Server computing device 410 may compare the collected sensor data from each vehicle to stored sensor values from previous detections. Server computing device 410 may also compare the collected components data with stored predetermined requirements. In some instances, the plurality of performance checks may be performed by computing device of each vehicle, and only the results (pass/fail) are uploaded to server computing device 410. Sever computing device 410 may then designate modes of operations for subsets of vehicles of the plurality of vehicles based on the plurality of performance checks as described above, such as based on passing a threshold number or percentage of performance checks, particular sets of performance checks, other factors such as type of vehicle or traffic law, etc. For another example, server computing device 410 may designate modes of operations further based on a planned distribution or demand for the vehicles in the fleet.

Figure 10:
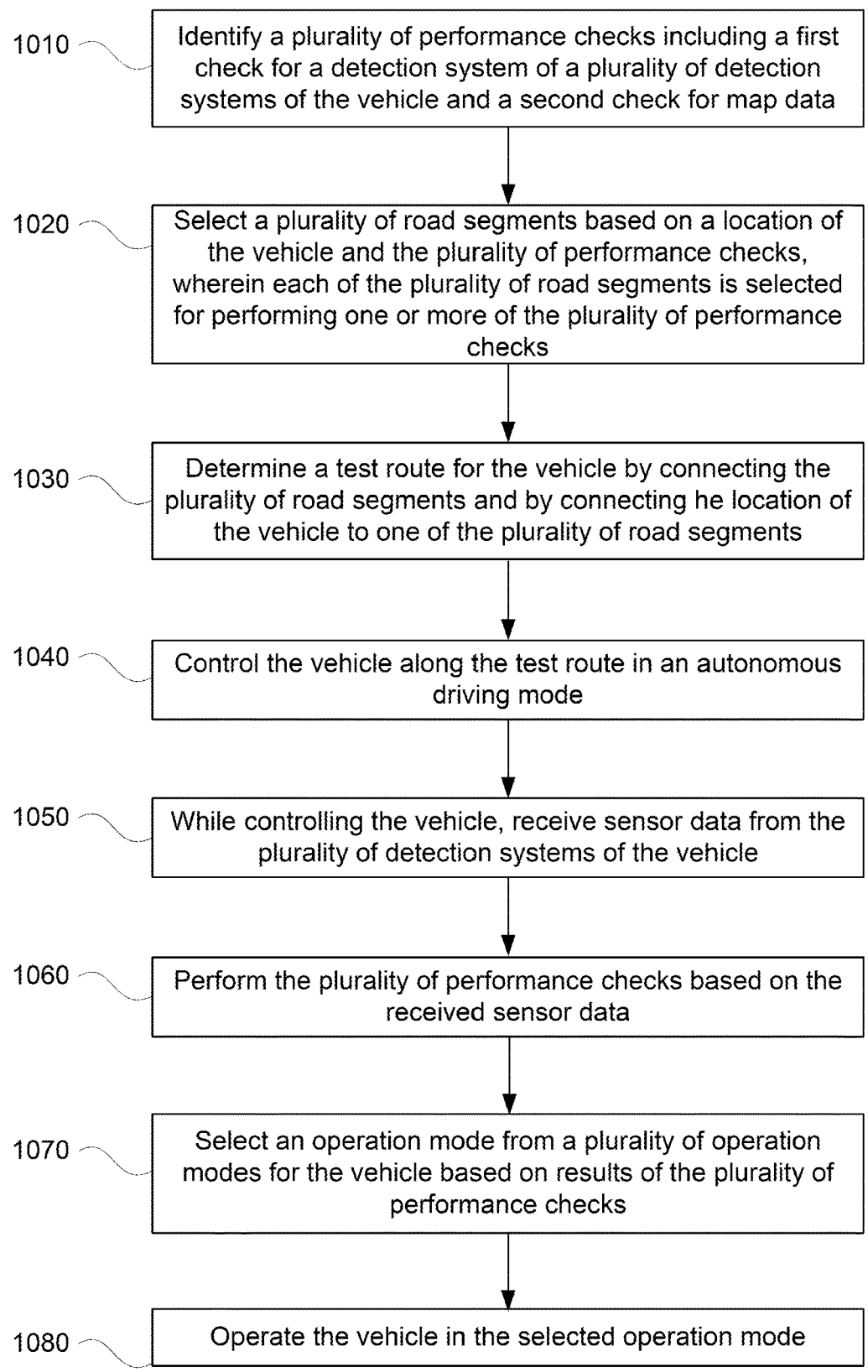
FIG. 10 is an example flow diagram in accordance with aspects of the disclosure.

FIG. 10 shows an example flow diagram 1000 of an example method for performing a plurality of performance checks. The example method may be performed by one or more processors, such as one or more processors 120 of computing device 110. For example, processors 120 of computing device 110 may receive data and make various determinations as shown in flow diagram 1000, and control the vehicle 100 based on these determinations.

Referring to FIG. 10, in block 1010, a plurality of performance checks are identified, including a first check for a detection system of a plurality of detection systems of the vehicle and a second check for map data. In block 1020, a plurality of road segments are selected based on a location of the vehicle and the plurality of performance checks, wherein each of the plurality of road segments is selected for performing one or more of the plurality of performance checks. In block 1030, a test route is determined for the vehicle by connecting the plurality of road segments and by connecting the location of the vehicle to one of the plurality of road segments. For example, a plurality of road segments and a test route may be determined as described in relation to FIG. 6. In block 1040, the vehicle is controlled along the test route in an autonomous driving mode. In block 1050, while controlling the vehicle, sensor data are received from the plurality of detection systems of a vehicle. For example, sensor data collected on a test route may be received by computing device 110 as described in relation to FIG. 7.

In block 1060, the plurality of performance checks are performed based on the received sensor data. For example, one or more sensor checks may be performed by comparing the collected sensor data with stored previous sensor data. For another example, one or more map checks may be performed by comparing the collected sensor data with map data. In block 1070, an operation mode is selected from a plurality of operation modes for the vehicle based on results of the plurality of performance checks. For example, the driving mode may be selected based on the results meeting a threshold number or percentage of performance checks. In block 1080, the vehicle is operated in the selected operation mode. For example, operating in the selected operation mode may include using corrections to sensor data or updates to map data.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system in a vehicle, the system comprising:
a computing device including one or more processors, the processors configured to:
identify a plurality of performance checks including a first check for a detection system of a plurality of detection systems of the vehicle and a second check for map data;
select a plurality of road segments based on a location of the vehicle and the plurality of performance checks, wherein each of the plurality of road segments is selected for performing one or more of the plurality of performance checks;
determine a test route for the vehicle by connecting the plurality of road segments and by connecting the location of the vehicle to one of the plurality of road segments;
control the vehicle along the test route in an autonomous driving mode;
while controlling the vehicle, receive sensor data from the plurality of detection systems of the vehicle;
perform the plurality of performance checks based on the received sensor data;
select an operation mode from a plurality of operation modes for the vehicle based on results of the plurality of performance checks; and
operate the vehicle in the selected operation mode.

2. The system of claim 1, wherein the plurality of road segments includes a first road segment, wherein one or more of the plurality of performance checks are performed using one or more traffic features or stationary objects that are detectable along the first road segment.

3. The system of claim 1, wherein the plurality of road segments includes a second road segment on which a maneuver required for one or more of the plurality of performance checks can be performed.

4. The system of claim 1, wherein the first check includes comparing characteristics of a detected traffic feature with previously detected characteristics of the traffic feature.

5. The system of claim 1, wherein the second check includes comparing a location of a detected traffic feature with a location of the detected traffic feature in the map data.

6. The system of claim 1, wherein the plurality of performance checks further includes a third check for a component of the vehicle, the third check includes comparing one or more measurements related to the component of the vehicle with a threshold measurement.

7. The system of claim 1, wherein the operation mode is selected based on the results satisfying a threshold number of the plurality of performance checks.

8. The system of claim 1, wherein the operation mode is selected based on the results satisfying one or more set of performance checks of the plurality of performance checks.

9. The system of claim 1, wherein the one or more processors are further configured to:
determine one or more corrections to at least one of the detection systems based on the results of the plurality of performance checks.

10. The system of claim 9, wherein operating in the selected operation mode includes using the one or more corrections.

11. The system of claim 1, wherein the one or more processors are further configured to:

update the map data based on the results of the plurality of performance checks.

12. The system of claim 11, wherein operating in the selected operation mode includes using the updated map data.

13. The system of claim 1, wherein the selected operation mode is an inactive mode.

14. The system of claim 1, further comprising: the vehicle.

15. A method for performing checks on a vehicle, the method comprising:
- identifying, by one or more processors of a computing device in the vehicle, a plurality of performance checks including a first check for a detection system of a plurality of detection systems of the vehicle and a second check for map data;
- selecting, by the one or more processors, a plurality of road segments based on a location of the vehicle and the plurality of performance checks, wherein each of the plurality of road segments is selected for performing one or more of the plurality of performance checks;
- determining, by the one or more processors, a test route for the vehicle by connecting the plurality of road segments and by connecting the location of the vehicle to one of the plurality of road segments;
- controlling, by the one or more processors, the vehicle along the test route in an autonomous driving mode;
- while controlling the vehicle, receiving, by the one or more processors, sensor data from the plurality of detection systems of the vehicle;
- performing, by the one or more processors, the plurality of performance checks based on the received sensor data;
- selecting, by the one or more processors, an operation mode from a plurality of operation modes for the vehicle based on results of the plurality of performance checks; and
- operating, by the one or more processors, the vehicle in the selected operation mode.

16. The method of claim 15, wherein the plurality of road segments includes a first road segment, wherein one or more of the plurality of performance checks are performed using one or more traffic features or stationary objects that are detectable along the first road segment.

17. The method of claim 15, wherein the plurality of road segments includes a second road segment on which a maneuver required for one or more of the plurality of performance checks can be performed.

18. The method of claim 15, further comprising:
- determining, by the one or more processors, one or more corrections to at least one of the detection systems based on the results of the plurality of performance checks, wherein operating in the selected operation mode includes using the one or more corrections.

19. The method of claim 15, further comprising:
- updating, by the one or more processors, the map data based on the results of the plurality of performance checks, wherein operating in the selected operation mode includes using the updated map data.

20. The method of claim 15, wherein the plurality of performance checks are performed at a regular interval.

* * * * *